United States Patent
Wobben

(10) Patent No.: US 6,867,710 B2
(45) Date of Patent: Mar. 15, 2005

(54) AIRCRAFT BEACON DEVICE ON WIND POWER INSTALLATIONS

(76) Inventor: Aloys Wobben, Argestrasse 19, Aurich, D-26607 (DE)

(*) Notice: Subject to any disclaimer, the term of this patent is extended or adjusted under 35 U.S.C. 154(b) by 0 days.

(21) Appl. No.: 10/275,743

(22) PCT Filed: May 8, 2001

(86) PCT No.: PCT/EP01/05194

§ 371 (c)(1),
(2), (4) Date: Feb. 27, 2003

(87) PCT Pub. No.: WO01/86606

PCT Pub. Date: Nov. 15, 2001

(65) Prior Publication Data

US 2003/0156047 A1 Aug. 21, 2003

(30) Foreign Application Priority Data

May 9, 2000 (DE) .................................... 200 08 289 U

(51) Int. Cl.[7] .............................................. G08B 23/00
(52) U.S. Cl. ...................... 340/963; 340/945; 340/953; 340/959; 340/964; 340/971; 340/980; 340/983; 340/981
(58) Field of Search ................................ 340/963, 945, 340/953, 959, 964, 971, 980, 983, 981

(56) References Cited

U.S. PATENT DOCUMENTS

| 4,620,190 A | 10/1986 | Tigwell et al. ............... 340/985 |
| 6,013,985 A | 1/2000 | Green et al. ................. 315/149 |

FOREIGN PATENT DOCUMENTS

| DE | 2 257 457 | 7/1973 |
| GB | 1 383 653 | 2/1975 |
| GB | 2 315 123 A | 1/1998 |
| WO | WO 97/29320 | 8/1997 |

*Primary Examiner*—Daniel Wu
*Assistant Examiner*—Tai T. Nguyen
(74) *Attorney, Agent, or Firm*—Seed IP Law Group PLLC

(57) ABSTRACT

The object of the invention is to improve a flight warning light arrangement of wind power installations and in particular to make the operation thereof as effect as possible.

Figure 1:
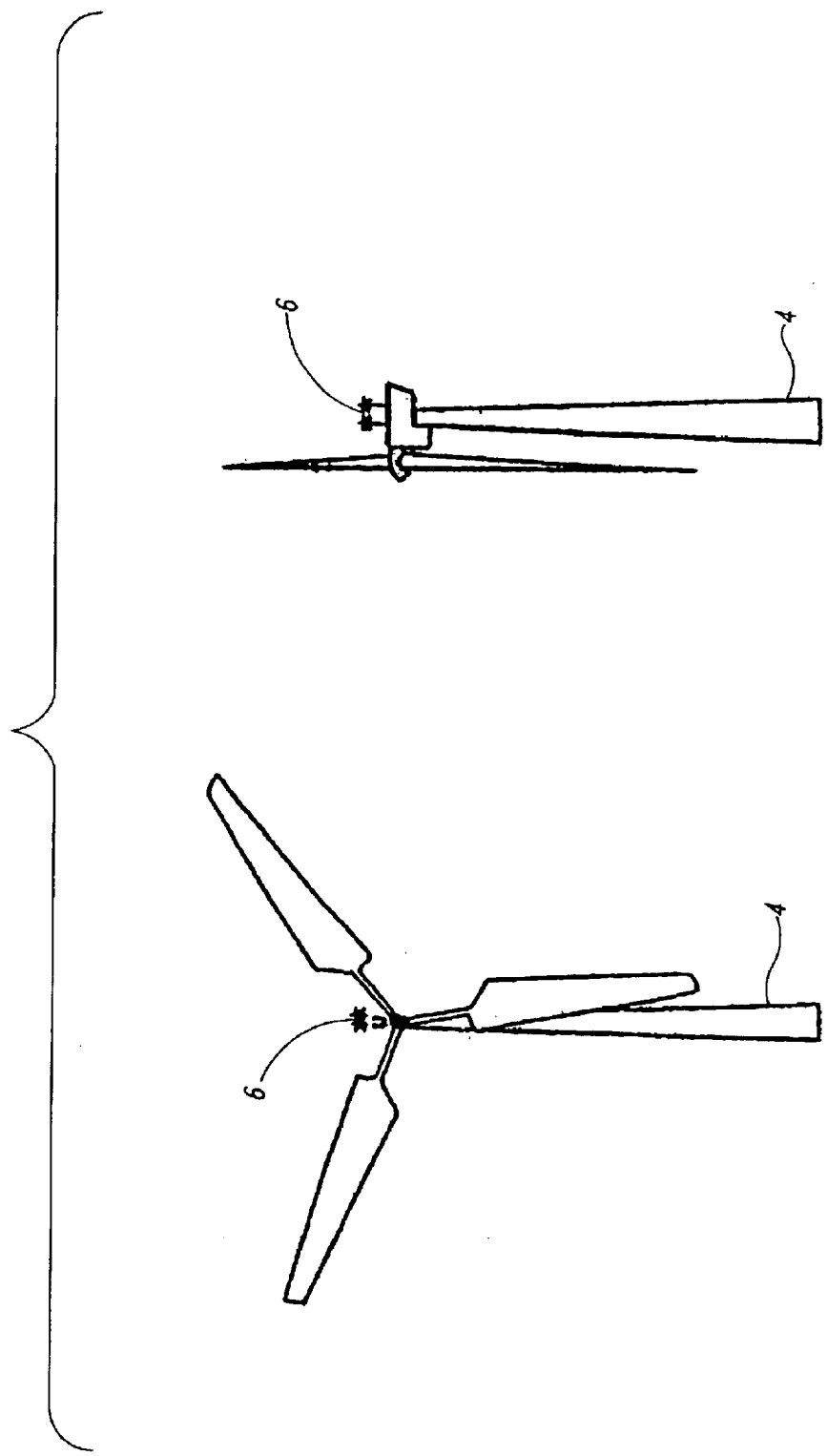

Disclosed is a flight warning light arrangement for a wind power installation, comprising at least one light means which is mounted on the wind power installation, wherein there is provided a device for detecting the brightness value, for example a twilight switch which detects the level of daytime brightness in the area around the wind power installation, and the device for detecting the brightness value is connected to a switching device which evaluates the measured data and switches on the flight warning light arrangement when the brightness value falls below a given value.

19 Claims, 4 Drawing Sheets

AIRCRAFT BEACON DEVICE ON WIND POWER INSTALLATIONS

BACKGROUND OF THE INVENTION

1. Field of the Invention

The present invention concerns a flight warning light arrangement on a building of great height, preferably a pylon of a wind power installation, comprising at least one light means and at least one switching device which switches the light means.

2. Description of the Related Art

Depending on their respective location and the requirements of the respective authorities buildings as from a certain height must be equipped with what is known as a night identification or a flight warning light arrangement for aircraft safety. With a total height (rotor blade in the 12 o'clock position) of below 100 m the night identification system comprises a so-called hazard light while with a total height of over 100 m a so-called danger light is required.

A hazard warning light arrangement usually comprises two light means (two light units) which are permanently lit at night while the danger light has two flashing lights (and two reserve lights) which light alternately in a predetermined rhythm. The light strength of a danger light is a multiple greater than that of a hazard light. An emergency power supply must also be provided depending on the respective requirements involved.

BRIEF SUMMARY OF THE INVENTION

One object of the invention is to improve a flight warning light arrangement of wind power installations and in particular to make the operation thereof more effective.

In accordance with the invention there is proposed a flight warning light arrangement which preferably has the following features which can be implemented alone or cumulatively.

First of all it is meaningful for the hazard light arrangement but also the danger light arrangement to be activated only when the overall environment has assumed a given brightness value. Such brightness value can be detected by a twilight switch which is set to a predetermined brightness value and the flight warning light arrangement is activated when the brightness value reaches, namely, falls below, a given value.

Such a twilight switch makes it possible to avoid unnecessarily switching on the flight warning light arrangement so that the overall service life of the light means is prolonged, while an adequate level of safety is always still guaranteed.

A further configuration of the invention provides that the wind power installation is equipped with a visibility measuring device. That measuring device makes it possible to detect the visibility range, which is desirable in particular in mist or fog or other disadvantageous weather conditions, such as heavy rain. If the visibility measuring device detects that the visibility has fallen below a threshold level visibility range. Further, this threshold level of the critical visibility range can be adjusted, the flight warning light arrangement is also activated so as always to afford sufficient building safety.

If a plurality of wind power installations are erected together, which is generally the case in wind parks, and if those wind power installations have to be equipped with a danger lighting arrangement by virtue of their great height, it is often very disturbing/irritating for air and automobile traffic if the danger lights on each individual wind power installation flash at different times (that is to say are switched on and off respectively). For that purpose the invention provides for the implementation of a synchronization device, by means of which the flashing lights are synchronized in such a way that all flashing lights of all wind power installations of a wind park flash (that is to say therefore are switched on and off) at the same time. In that respect synchronization can be effected by way of radio and/or data signals and the synchronization device can comprise a data processing device which, coupled to a timer, generates the switch-on and switch-off signals for the flashing lights, so that the intended aim is attained.

A flight warning light arrangement must be designed to be so safe in relation to a wind power installation that it is still operational even when the entire wind power installation is taken off the electrical network or the rotor of the wind power installation is stationary. Therefore, there is proposed an emergency power supply device for a wind power installation and the flight warning light arrangement thereof so that the flight warning light arrangement can be maintained at least for a night. For that purpose, in the case of the wind power installation there is provided a (preferably airconditioned) switch cabinet, in which all the control devices for the flight warning light arrangement are arranged and in addition also batteries or accumulators which supply the necessary energy for the flight warning light arrangement. Those batteries or accumulators are preferably absolutely maintenance-free.

For a plurality of wind power installations of a wind park it is also possible to provide a central switch cabinet for emergency power for and control of the flight warning light arrangement.

The flight warning light arrangement controls not only the respective flight warning lighting (hazard lighting, danger light) but in addition also monitors any trouble in various items of equipment such as failure of the supply voltage, failure of a lamp, trouble with the twilight switch, trouble with batteries or the charging device for charging up the accumulators, trouble with the air conditioning of the switch cabinet, failure of the visibility measurement arrangement (if such is provided) and trouble with synchronization (only in relation to danger lighting).

If such a fault message is established, it is automatically transmitted to a central station by way of the connection to the installation control system. The fault message can be transmitted to the central station by means of fax, SMS, or also e-mail.

The danger light arrangement comprises two main lights and two reserve lights respectively. The light strength of the flashes is more than 1600 cd/flash. The flashes are in a housing of protective kind IP 67. The light means here is a xenon flash tube with a rated life of about 2,000,000 flashes (corresponds to about 12 months).

If a main flashing light fails the arrangement is automatically switched over to the redundant second system, which contains a reserve light and a fault message is sent to the central station.

The hazard light arrangement comprises two hazard lights and is preferably equipped with light means comprising LEDs. The light means are disposed in a housing of protective kind IP 67. As the operating time of the above-described hazard lights is recorded no redundant system is required with this structure. The use of LED light means provides that current consumption is very low and the operating life of at least 10 years is very long.

A further aspect of the invention provides that particularly in relation to building sites, for example for wind power installations, on which the pylon of the wind power installation is already erected but the machine housing, the rotor, the generator and the electrical installations are not yet present, there is no flight warning light arrangement although the pylon certainly constitutes a flight hazard or a danger point.

In accordance with the invention, to resolve that problem, there is proposed a flight warning light arrangement which has a transportable energy supply. Such an autonomous energy supply which is independent of a fixed installation means that any building if required can be equipped with a flight warning light arrangement. That permits the building to be identified, which is required in the interests of flight safety, even when a power supply to the building has not yet been made.

In preferred developments of the invention a flight warning light arrangement according to the invention can have the following features which can be implemented alone or in combinations.

The use of twilight switches means that the possible operating time can be prolonged.

Accumulators and/or capacitors, for example of the 'Ultracap' type can be envisaged as the energy storage means. To supplement the supply of energy it is possible to provide for example photovoltaic modules and/or a transportable generator with a rotor for the conversion of wind power into electrical energy. Both the photovoltaic module and also the generator admittedly supply only a limited amount of energy, but this can be continuously fed into the energy storage means for example by way of a suitable control such as a charge regulator, and taken therefrom as required. Thus, theoretically operation which is unlimited in respect of time is possible with a suitable design configuration for the energy storage means.

In order to increase the service life of accumulators and to avoid very deep discharging thereof, it is preferably possible to provide a so-called accumulator monitor which, when a predeterminable lower terminal voltage of the accumulator or accumulators is reached, prevents energy from being taken therefrom.

Besides monitoring the individual components, it is possible to provide a device which in the event of a fault sends a fault message for example to a predetermined central station. Such a device preferably includes a GSM module which for example by way of a radio communication can send a short message (SMS) which draws the attention of the recipient to the fault.

In addition it is possible to provide a transportation container in which the individual components of the flight warning light arrangement such as accumulators, switching device, GSM module, charge regulator, accumulator monitor and so forth are disposed. In that respect the lights can preferably be disposed on the top of the transportation arrangement so that the entire flight warning light arrangement according to the invention can be handled as a unit.

In a particularly preferred feature also provided in the transportation container are holders for the parts of the flight warning light arrangement which in operation are necessarily disposed outside the container, such as for example the photovoltaic module and/or the generator, so that those parts, for transportation, are also disposed in the transportation container and therefore cannot be lost.

In that respect the generator and/or the photovoltaic module, during operation, can be fixed to the transportation container or, removed therefrom, can be fixed to appropriate locations at the tip of the wind power installation pylon. That fixing can again be effected by way of suitable holders (flanges).

If the transportation container is of a sufficient height the lights during transportation can also be stowed in the container so that on the one hand they are not lost and on the other hand they are also protected from damage. For that purpose the top of the container is advantageously designed in such a way that it sealingly closes the container, both with the lights mounted thereon facing upwardly and also with the lights mounted thereon facing downwardly, and thus reliably protects the interior of the container from the influences of the weather.

In order to implement simple handling, the electrical connection between the switching device or the change-over switching arrangement is preferably made by a releasable cable connection. In that respect the cable connection is preferably releasable on the switching device with one or more connectors.

The upper cover of the transportation container, on which cover the lights are provided, has a compartment which accommodates the connecting cable between the lights and the switching device. That compartment can have a cover which closes the compartment in the transportation position of the top of the container, with lights projecting into the container.

For synchronization of a plurality of flight warning light arrangements, they can have a radio receiver which receives signals from a central transmitter such as the DCF transmitter of the 'PhysikalischTechnische Bundesanstalt' [Physics-Technical Federal Institute] and at predetermined moments in time which can be derived from the radio signal, triggers given switching procedures such as flashing pulses for the lights. It will be appreciated that, as an alternative to a DCF receiver, a plurality of spatially adjacent flight warning light arrangements can also be controlled by way of radio signals from a predeterminable transmitting station such as for example a master installation.

BRIEF DESCRIPTION OF THE SEVERAL VIEWS OF THE DRAWING(S)

Figure 2:
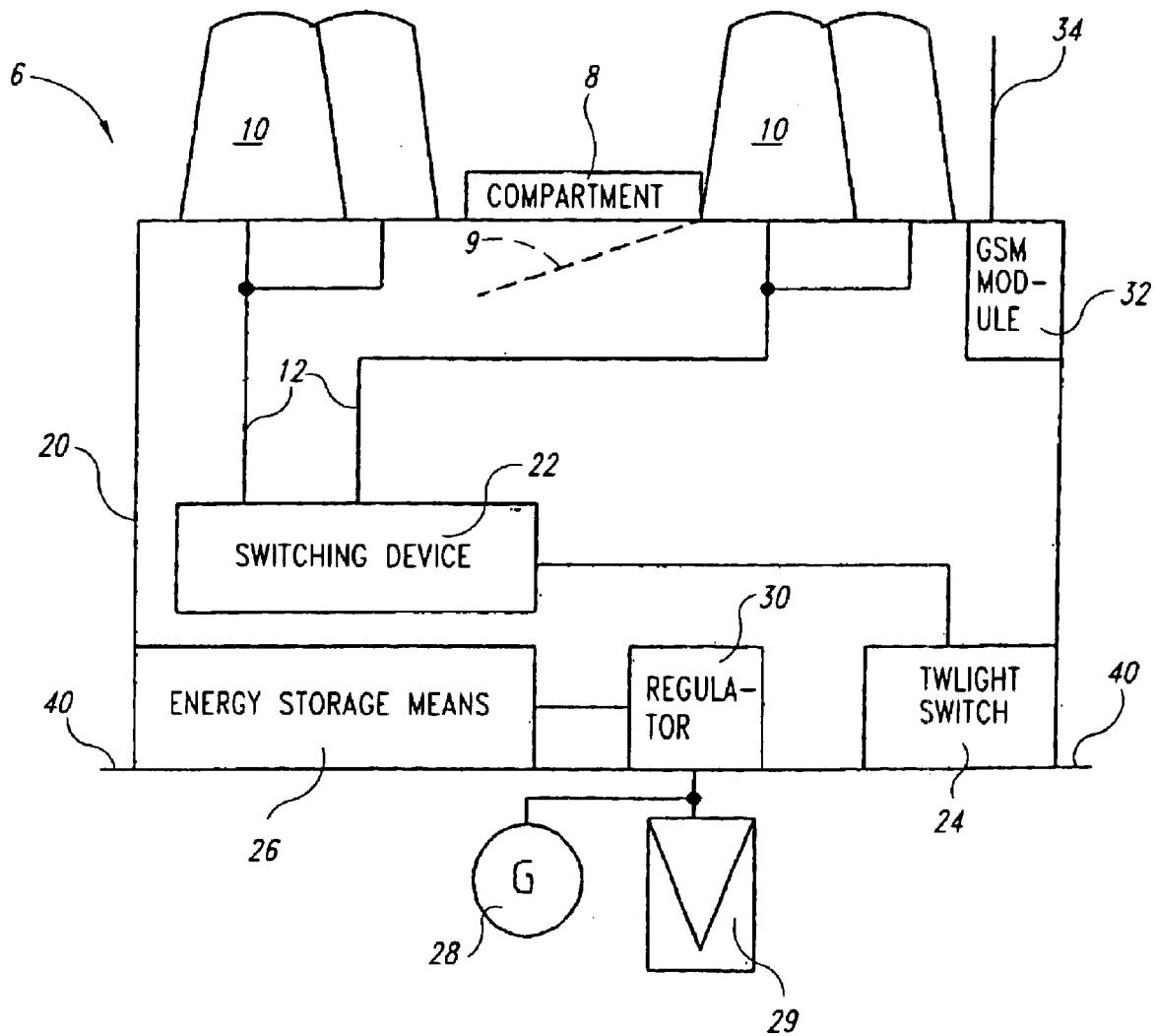
Figure 3:
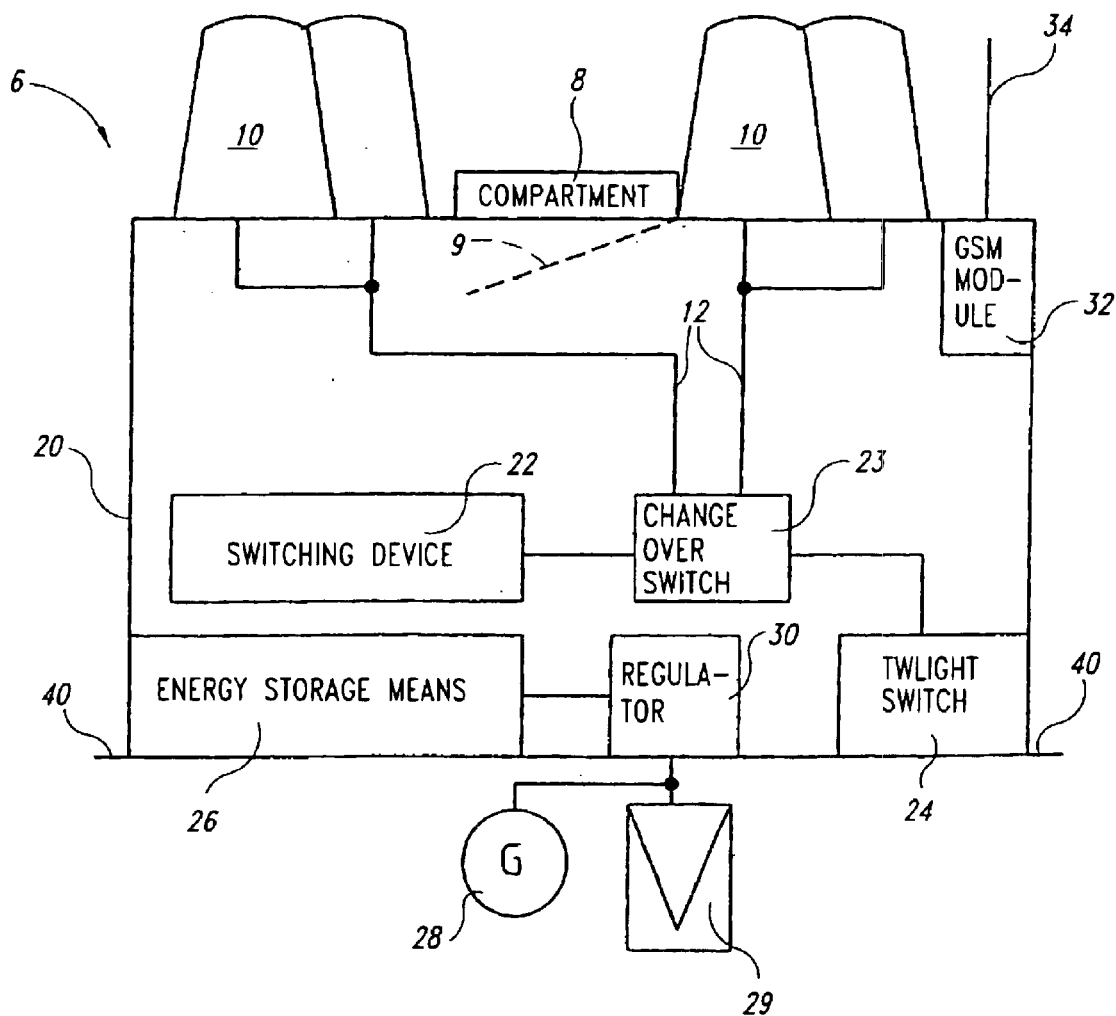
Figure 4:
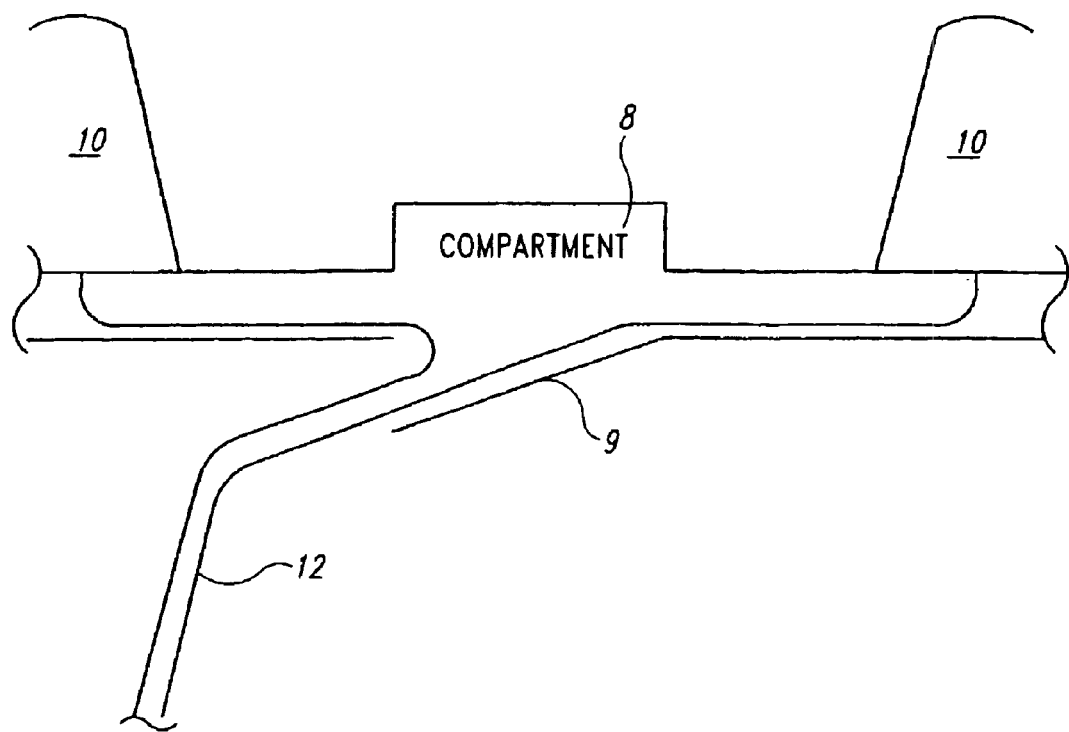

Embodiments of the invention are illustrated in the drawing in which:

FIG. 1 shows a front view and a side view of a wind power installation with a hazard or danger light according to the invention, FIG. 2 shows a first embodiment of a transportable energy source according to the invention for supplying energy to a flight warning light arrangement, FIG. 3 shows an alternative embodiment of a transportable energy source according to the invention, and FIG. 4 shows a detail view of a cover of a transportation container.

DETAILED DESCRIPTION OF THE INVENTION

FIG. 1 is a diagrammatic front and side view respectively of a wind power installation 4 with a flight warning light arrangement 6 according to the invention. That flight warning light arrangement 6 arranged on the pod.

When the lights are in the form of danger lights they flash between 20 and 60 times per minute. Their switch-on time during the flashing phase is longer than the dark phase. It is also possible to use red flashing lights. The flashing frequency is to be between 20 and 60 times per minute. Moreover a hazard or danger light has to comply with the Directives for the Identification of Aviation Hazards of the Federal Ministry for Traffic, Building and Housing of Dec. 22, 1999 (Danger Light Order).

FIG. 2 shows a transportation container 20 with a switching device 22 in which a light monitoring arrangement can be integrated. The switching device 22 operates lights 10 in a predeterminable manner which can be predetermined for example by fixed wiring or by a microprocessor control. The switching device can also be influenced by external signals. They can originate from a twilight switch 24.

Such a twilight switch 24 is provided in order to influence the flight warning light arrangement according to the invention, in dependence on ambient brightness. That influencing effect can be to provide for switching the flight warning light arrangement on and off, at a given level of ambient brightness.

The power supply for the entire flight warning light arrangement is afforded by an energy storage means 26 which can be formed from accumulators and/or capacitors or the like. The energy storage means 26 can be fed by a generator for converting wind power into electrical energy 28 and/or a photovoltaic module 29 which are connected by way of a charge regulator 30 to the energy storage means 26. The charge regulator 30 provides for charging the accumulators or capacitors with suitable voltages and currents.

The generator 28 and the photovoltaic module 29 are of such dimensions that they can be disposed in the transportation container 20 for transportation of the flight warning light arrangement. In that way they are protected from damage during transportation and cannot become lost so that all components of the flight warning light arrangement are always present.

In FIG. 2 mounted on the transportation container 20 are two respective pairs of lights 10 of which one is the main pair of lights and the other is the reserve pair of lights. Also disposed on the transportation container 20 is an antenna 34 connected to a GSM module 32 disposed in the container. In the case of faults for example suitable fault messages can be sent to predetermined receivers by way of that GSM module 32.

In order to permit fixing of the flight warning light arrangement according to the invention to the pylon, provided on the transportation container 20 are fixing flanges 40 by which it can be fixed with screws to the pylon.

The electrical connection between the switching device 22 and the lights 10 is made by cables 12. The cables 12 are preferably releasable on the switching device 22 so that the cover of the transportation container 20 with the lights 10 mounted thereon, including the electrical connections, can be completely released from the transportation container 20.

For transportation of the flight warning light arrangement the top with the lights 10 mounted thereon can then be fitted on to the transportation container 20 in such a way that the lights 10 are disposed in the interior of the transportation container 20. In that installation condition of the top the cables 12 are now at the outside of the transportation container 20. In order to protect the cables 12 they can be stowed in a compartment 8 which is closable with a cover 9.

FIG. 3 substantially corresponds to FIG. 2. The difference is that here a change-over switching device 23 is provided. The change-over switching device 23 receives the signals for actuation of the lights 10 from the switching device 22 and passes them on to the lights 10. The change-over switching device 22 is further influenced by the twilight switch 24. In that respect the change-over switching device is controlled in such a way that, in dependence on the level of ambient brightness, a respective one of the two pairs of lights 10 is supplied with the signals from the switching device 22.

If the arrangement has lights 10 of varying colors, for example red lights for night time illumination and white lights for daytime illumination, the twilight switch 24 can alternatively be used to provide for switching over between daytime and night time illumination, in dependence on the level of ambient brightness. It will be appreciated that the change-over switching device required for switching over between daytime illumination and night time illumination can be integrated into the switching device 22.

FIG. 4 shows a detail view of a possible way of laying the cables. The cables 12 are mounted to the lights 10. In operation the flap 9 which faces into the transportation container is open and the cables 12 can be connected to the switching device 22 or the change-over switching device 23.

For transportation of the flight warning light arrangement the cover is turned in such a way that the lights 10 face downwardly (into the transportation container). The cables 12 which are now at the top side are then unprotected if they are not accommodated in the compartment 8. In order to prevent damage to the cables 12 they can be laid within a double-shell cover, and issue from the cover in the region of the covering for the compartment 9 and be taken to the switching device 22 or the change-over switching device 23.

For transportation purposes the cables 12 can be stowed in the compartment 8. In that case the cover 9 which during transportation is on the outside of the transportation container can protect the compartment 8 and the interior of the double-shell cover from contamination and damage.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the forgoing it will be appreciated that, although specific embodiments of the invention have been described herein for purposes of illustration, various modifications may be made without deviating from the spirit and scope of the invention. Accordingly, the invention is not limited except by the appended claims.

What is claimed is:

1. A flight warning light arrangement of a wind power installation comprising:

at least one light means;

a device for detecting a brightness value in the area around the flight warning light arrangement;

a switching device, being connected to the device for detecting the brightness value, for evaluating a measured data of the device for detecting the brightness value, and for switching on at least one of the light means when the brightness value falls below a given value, wherein at least one of the light means are in the form of flashing lights; and a synchronization device for controling the light means and for providing a synchronization signal to at least one other flight warning light arrangement in a proximity of said flight warning light arrangement such that at least one of the light means of the flight warning light arrangement and a light means of at least one other flight warning light arrangement are switched on and off at the same time.

2. A flight warning light arrangement according to claim 1, characterized in that there is provided a visiblity measuring device, by means of which the light means are activated when a measured visibility value falls below a predetermined range.

3. A flight warning light arrangement according to claim 1, characterized in that the light means are in the form of flashing lights and that there is provided a synchronization device which controls the light means in such a way that the light means of the flight warning light arraignment and also a light means comprised of other flashing lights in the proximity are switched on and off respectively at the same time.

4. A flight warning light arrangement according to claim 3 characterized in that the synchronization device controls at least one other flight warning light arrangements by at least one of a radio signal and a data signal control.

5. A flight warning light arrangement, according to claim 1, characterized in that at least one of the light means comprises a plurality of light emitting diodes.

6. A flight warning light arrangement according to claim 1, characterized by a transportable energy source for a supply of power to at least one of the light means and the switching device.

7. A flight warning light arrangement according to claim 6 characterized by an intermediate energy storage means which is coupleable to an energy-producing means.

8. A flight warning light arrangement according to claim 6 characterized by a GSM module for communication of fault messages.

9. A flight warning light arrangement according to claim 6 characterized in that at least one of the light means is fixable to a transportation container.

10. A flight warning light arrangement according to claim 9 characterized in that a height of the transportation container is such that at least a height of at least one of the light means remains free between the components installed in the transportation container and an edge of the transportation container.

11. A flight warning light arrangement according to claim 6 characterized in that at least one of the light means is arranged separately from the transportation container during operation of the flight warning light arrangement.

12. A flight warning light arrangement according to claim 6 characterized by at least one electrical connection which is releasable on at least one side between at least one of the light means and the switching device or a change-over switching device.

13. A flight warning light arrangement according to claim 6 characterized by a receiving compartment for cables.

14. A flight warning light arrangement according to claim 1 characterized in that at least one of the switching device and a twilight switch are combined with at least one of the light means.

15. A flight warning light arrangement according to claim 1 characterized in that there are provided at least two light means of different colors.

16. A flight warning light arrangement according to claim 15 characterized by a change-over switching device which respectively connects the light means of a same color to the switching device.

17. A flight warning light arrangement according to claim 16 characterized in that a twilight switch co-operates with the change-over switching device.

18. A flight warning light arrangement according to claim 1 characterized by a receiving device for radio signals, which co-operates with at least one of a twilight switch and the switching device.

19. A flight warning light arrangement comprising:

a transportable energy source;

a transportation container for transportation of the energy source, the transportation container having at least one intermediate energy storage means which is fed with an energy-producing means in the form of a generator for converting wind power into electrical energy or a photovoltaic module, wherein a charge regulator is connected between the intermediate energy storage means and the energy-producing means, the flight warning light arrangement further having:

one or more light means;

a device for detecting a brightness value in an area around the flight warning light arrangement; and a switching device connected to the device for detecting the brightness value, for evaluating the brightness value and for switching on at least one of the light means when the brightness value falls below a given value and the energy-producing means during the operation of the flight warning light arrangement is fixed to the transportation container or removed therefrom and is fixed to an appropriate locations at a tip of a building.

* * * * *